(12) United States Patent
Burba et al.

(10) Patent No.: US 12,480,181 B2
(45) Date of Patent: Nov. 25, 2025

(54) ION EXTRACTION COLUMN FOR BRINE

(71) Applicant: International Battery Metals, Ltd., Houston, TX (US)

(72) Inventors: John L. Burba, Houston, TX (US); Josh Hebert, Houston, TX (US)

(73) Assignee: International Battery Metals, Ltd., Houston, TX (US)

( * ) Notice: Subject to any disclaimer, the term of this patent is extended or adjusted under 35 U.S.C. 154(b) by 0 days.

(21) Appl. No.: 18/887,998

(22) Filed: Sep. 17, 2024

(65) Prior Publication Data

US 2025/0092490 A1 Mar. 20, 2025

Related U.S. Application Data

(60) Provisional application No. 63/539,494, filed on Sep. 20, 2023.

(51) Int. Cl.
  *C22B 26/12* (2006.01)
  *C22B 3/02* (2006.01)
  *C22B 3/26* (2006.01)

(52) U.S. Cl.
  CPC .............. *C22B 26/12* (2013.01); *C22B 3/02* (2013.01); *C22B 3/26* (2021.05)

(58) Field of Classification Search
  CPC .............. C22B 26/12; C22B 3/26; C22B 3/02
  See application file for complete search history.

(56) References Cited

U.S. PATENT DOCUMENTS

| | | | |
|---|---|---|---|
| 2021/0246529 A1 | 8/2021 | Jariwala et al. | |
| 2022/0055910 A1 | 2/2022 | Jariwala et al. | |
| 2022/0212144 A1 | 7/2022 | Burba | |
| 2023/0357942 A1* | 11/2023 | Perroni | C02F 1/469 |
| 2023/0373803 A1* | 11/2023 | Perroni | C01D 15/08 |
| 2023/0392233 A1* | 12/2023 | Perroni | C22B 3/44 |

FOREIGN PATENT DOCUMENTS

| | | | | |
|---|---|---|---|---|
| WO | WO-2010065738 A1 * | 6/2010 | | C02F 9/00 |
| WO | WO-2015171109 A1 * | 11/2015 | | B01J 20/041 |
| WO | 2023064320 A1 | 4/2023 | | |
| WO | WO-2023063928 A1 * | 4/2023 | | B01D 15/08 |

OTHER PUBLICATIONS

WIPO; International Search Report and Written Opinion dated Dec. 2, 2025 in PCT/US2024/047170.

* cited by examiner

*Primary Examiner* — Wayne A Langel
(74) *Attorney, Agent, or Firm* — Snell & Wilmer L.L.P.

(57) ABSTRACT

Methods of the present disclosure may be referred to as direct material extraction. Brine may be moved into a media bed such that extractant materials in the media bed absorb ions of a target material without absorbing other materials included in the brine. Desired ion(s) may be transported into the extractant and be held there temporally based on ionic bonds that form between the desired ions and the extractant material. Apparatuses of the present disclosure may contain the extractant material, receive brine, and may receive a stripping solution such that desired materials are separated from other materials included in the brine. After the extractant material has absorbed the desired materials, a flow of stripping solution may be used to flush other materials out of an apparatus and then to flush the desired materials out of the extractant material.

20 Claims, 7 Drawing Sheets

ION EXTRACTION COLUMN FOR BRINE

CROSS-REFERENCE TO RELATED APPLICATIONS

The present application claims priority benefit of U.S. Provisional Patent Application No. 63/539,494 entitled Ion Extraction Column for Brine, filed on Sep. 20, 2023, the disclosure of which is incorporated by reference herein. The presently disclosed technology has exemplary applicability in the Modular Extraction Apparatus described in U.S. Pat. No. 11,229,880, the disclosure of which is incorporated by reference herein.

TECHNICAL FIELD

The present disclosure relates generally to methods and arrangements for extracting desired ionic materials/minerals, and in particular to extracting specific chemical species out of brine input flows. Among others, lithium may be a target species, and therefore is used as the exemplar in this disclosure for explanation purposes.

BACKGROUND

Because of a desire to reduce reliance on fossil fuels, both local governments and the Federal government of the USA are providing incentives to individuals to purchase electric vehicles instead of vehicles that use internal combustion engines. Since electric vehicles require batteries that have a relatively high energy storage capacity, materials used to manufacture electric vehicle batteries are in demand. One material in particular that is in demand is lithium. Traditionally, lithium has been mined from dry deposits that are rich in lithium and lithium has been acquired by moving lithium-rich brines into ponds from which water is evaporated. Furthermore, other materials (e.g., minerals, metals, and elements) besides lithium (e.g., uranium) will also be important to the economy in the future. Evaporating water from brines to acquire minerals in those brines is a highly inefficient process as it either takes significant amounts of time to evaporate water in ponds or would require significant amounts of energy to evaporate water using an evaporation mechanism. Furthermore, acquiring materials like lithium from brine using evaporation ponds results in only about 45% of the lithium dissolved in the brines being recovered.

BRIEF DESCRIPTION OF THE DRAWINGS

In order to describe the manner in which the features and advantages of this disclosure can be obtained, a more particular description is provided with reference to specific embodiments thereof which are illustrated in the appended drawings.

DETAILED DISCLOSURE

Figure 1:
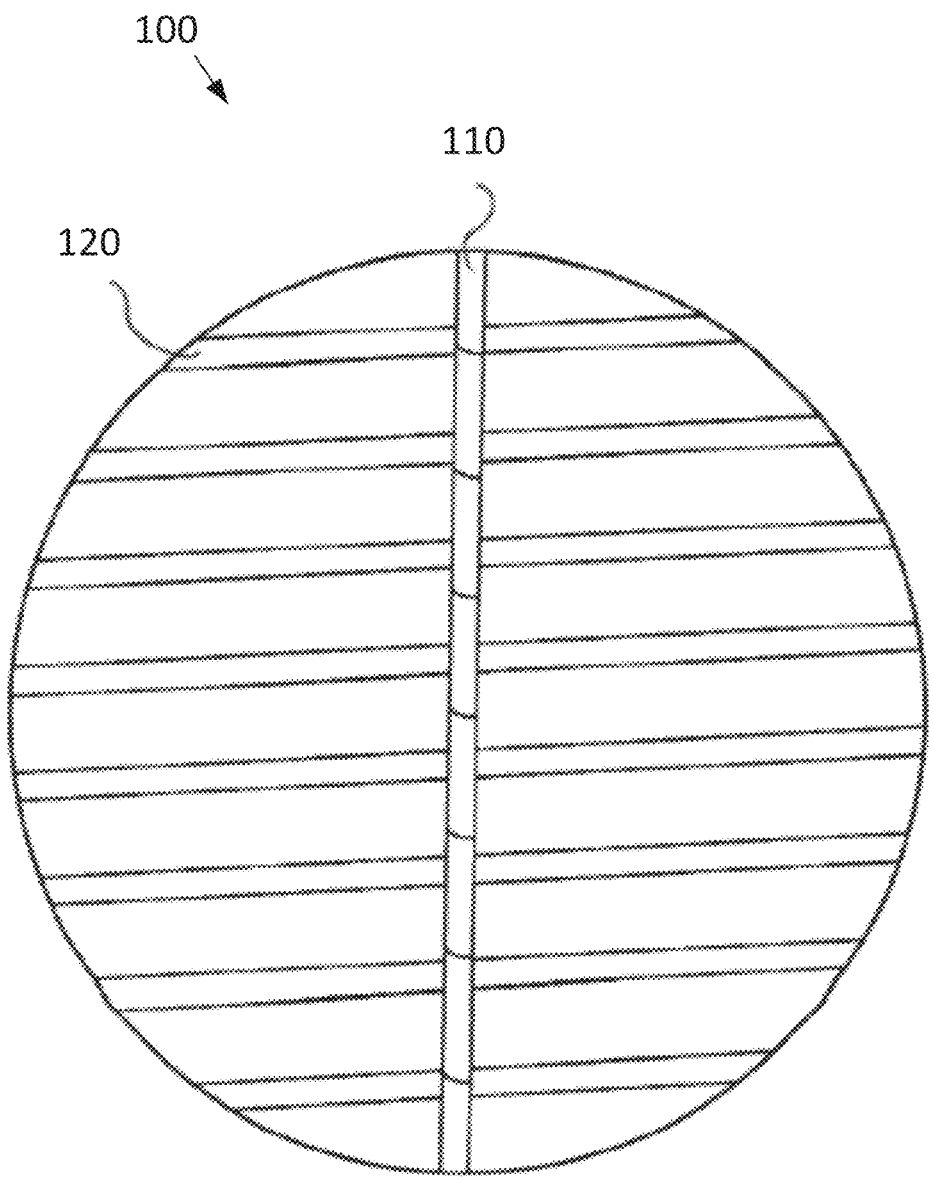
FIG. 1 illustrates an example apparatus that may be used to distribute fluid within an extraction column, in accordance with various aspects of the subject technology.

Several approaches have been used for extracting specific chemical species, such as lithium, from raw materials. For example, raw materials such as lithium-rich brine can be treated with chemicals, filtered, and purified to remove impurities. However, the extraction of lithium as a metal from raw materials is difficult and expensive, especially to achieve high purity levels.

The present disclosure describes methods and apparatuses for extracting target materials (e.g., lithium) from raw materials such as brine. In some aspects, methods of the present disclosure may be referred to as direct material extraction. In instances when lithium is extracted from brine, this method may be referred to as direct lithium extraction (DLE). In some examples, the present disclosure provides solutions for precisely controlling the liquid flow of the brine through a porous media bed to directly extract lithium and/or other valuable substances/ions (e.g., uranium) from brine. To illustrate, brine may be moved into a bed such that extractant materials in the bed absorb ions of a target material without absorbing other materials included in the brine. The "absorption" of the target material may be referred to as the target material "entering" the extractant. Desired ion(s) may be transported into the extractant and be held there temporally based on ionic bonds that form between the desired ions and the extractant material. During the process, desired ion(s) (e.g., lithium ions) are transported into the extractant (and held there), potentially to the point of ion saturation. At this juncture, the media bed includes an ion-laden extractant submerged in the last bit of brine pumped into an extraction column/vessel. As such, the porous media extractant will contain a significant portion of the lithium (or another target material) included in the brine, where other materials will remain in the solution.

In some aspects, apparatuses (e.g., an extraction vessel) of the present disclosure may contain the extractant material, receive brine, and may receive a stripping solution such that desired materials are separated from other materials included in the brine. After the extractant material has absorbed the desired materials, a flow of stripping solution may be used to flush other materials out of an apparatus and then to flush the desired materials out of the extractant material.

In some instances, the extractant may have a size that meets a uniformity standard/rule. Such a standard may specify one or more sizes of beads that form the extractant. Examples of such sizes include one or more of a cross-sectional area, a cross-sectional diameter, a measure of spherical association, or other size. This uniformity standard/rule may also specify a porosity of the extraction beads. In one instance, extraction beads may be slightly oblong (e.g., ellipse shaped or a shape that meets Hakon Wadell's definition of sphericity) with each of the extraction beads are, for example, 85% spherical (plus or minus some tolerance). The Hakon Wadell measure of sphericity is a ratio between the surface area of a sphere that encloses a specific volume and the surface area of a particle that also encloses the specific volume. By this definition, an extraction bead with an 85% (0.085) sphericity would have a surface area that is about 17.65% larger than the surface area of a perfect sphere when both the extraction bead and the sphere enclose the same volume. For example, when the surface area of the perfect sphere is 1 square millimeter, the volume of a particle (with 85% sphericity) that also encloses the same volume of the perfect sphere would have a surface area of 1.1765 millimeters: (1/1.1765)=0.0850.

Because of this, the shape of extraction beads (particles) may be specified within a range that includes a sphericity value and a tolerance value or percentage. For example, a rule may specify that extraction beads used for a given application must have a sphericity of 0.85 minus or plus 2 percent. In such an instance, acceptable sphericity values for these specific extraction beads ranges from 0.833 to 0.867. Such specifications may also specify a nominal enclosed volume of the extraction beads and/or a porosity of the beads. While a value of sphericity of 85% is discussed above, extraction beads may have a sphericity value chosen by an operator.

In some instances, before brine is placed into an extraction column/vessel that is filled with extraction beads, water may be placed into the vessel. This water may be flushed through the extraction column/vessel one or more times during a particle removal process. This may include back flushing, forward flushing, or a combination of forward flushing and back flushing operations. This may include providing water to the extraction column/vessel in a first (forward) direction and then moving water out of the extraction column/vessel in a second (reverse) direction. Such a flushing process may remove fines (e.g., fine particulate material) from the extraction beads.

After the brine is placed in the extraction column/vessel and ions of target materials have "entered" the extractant, portions of brine that have not "entered" the extractant may be disposed between external surfaces of the extractant. The brine portions that do not "enter" the extractant may be forced out of the vessel when a stripping solution is provided to the vessel. Continued delivery of the stripping solution to the vessel may allow the stripping solution to rinse the target material out of the extractant. When the density of the stripping solution is less than the density of the brine, the stripping solution will tend to float above the brine. By providing the stripping solution to a top portion of the extraction vessel and opening a drain valve at the bottom of the vessel, the presence of the stripping solution in the vessel will push brine out of the vessel. Initially, brine that includes materials other than the target material may exit the vessel. Later, the target material may exit the vessel based on the stripping solution breaking the ionic bonds that bind the ions of the target material to the extractant.

Example forms of the media bed include moving beds of extractant, simulated moving beds, and a series of fixed vessels. Regardless of bed format, the goal may be to produce a product that is devoid of undesirable brine components. This may be accomplished by creating a "sharp" interface between the brine and a stripping solution.

Stated in another way, a packed bed of extraction media positioned in a cylindrical column is described herein. Brine is pumped through the media until it is saturated with the desired ion of particular materials (e.g., lithium or uranium). Next, a stripping solution may be passed through the column for stripping out (solubilizing) the desired ion and regenerating the extractant. The stripping solution may act as a solubilizer to the target ions; typically aqueous, and exemplarily water. In certain instances, after the brine flow is stopped and when the media bed is submerged in brine, the stripping solution (e.g., water) may be distributed on top thereof. An interfacial concentration gradient may be formed in the column such that the brine is located in a lower zone of the column and the stripping solution is located in an upper zone of the column. This gradient (continuum of liquids) "pushes" down through the column "pressing out" the residual brine and solubilizing the target ions (e.g., ions of lithium or uranium) into the just-introduced stripping solution for subsequent ion reclamation, while at the same time regenerating the extractant.

The volumetric density of the stripping agent may be less than the volumetric density of the brine, and because of this, the stripping agent may tend to float on top of the brine included in the cylinder. Optimally, a clean separation of the target ions from the residual brine should be accomplished as the stripping solution is introduced. However, when dealing with such aqueous solutions, the mentioned gradient (continuum of liquids) may have a progressively intermixing interface "smear zone" between the lower brine zone and the upper stripping solution zone that "smears" down through an extraction vessel. Because of this, methods and apparatus of the present disclosure may mitigate the intermixing of fluids to maintain a bright-line interface between fluids with different volumetric densities within the vessel. A bright-line interface may be defined as a line that is horizontal to a gravitational force vector or line that separates the brine zone from the stripping solution zone in the vessel. Typically, when a cylindrically shaped vessel is used to extract target materials, the vessel will be stood up such that a vector along the height of the cylinder will be parallel to a force of gravity vector. As such, the line that separates the brine zone from the stripping solution will be perpendicular to a side wall of the cylinder. The sharpness of this separation line may be measured by a height of ripples or variances in this separation line or may be measured by a thickness smearing of this line. The aforementioned "smear zone" may be defined as an area where brine mixes with the stripping solution. As such the bright-line interface may be quantified as corresponding to a height of rippling or the thickness of the smear zone that is below a threshold value. Minimizing a total volume of this "smear zone" during an extraction process may help maximize the efficiency of that extraction process.

Without a bright-line interface between two solution zones, the extracted ion-in-stripping solution can take on varying amounts of brine which at this stage of the process is a contaminant. Consequences of such contamination include lowered yields and more highly contaminated product. The systems and techniques of the present disclosure as described herein produce a bright-line interface (e.g., brine-water interface), also referred to as a sharp concentration profile. The sharp gradient (e.g., a sharp interface) indicates that the physical boundary of the concentration of interest on one side of the boundary remains separate and evenly distributed along the boundary as the profile flows axially down the media bed in the extraction column.

An extractant may be a solid material that can remove (e.g., absorb) desired ions of a target material (e.g., lithium ions or uranium ions) from brine. The extractant material may "absorb" target materials based on quantum effects that allow the extractant material to bind to a ions of a selected target material (e.g., lithium or uranium) when the extraction material is submerged in brine. Other materials included in the brine (e.g., sodium or magnesium) may be retained in solution when the extractant material absorbs (binds to) ions of the target material. The extractant material may be porous and may have a shape (e.g., the specified sphericity mentioned above) that allows fluid to drain from the extraction column freely. The extractant material may be comprised of a plurality of beads that have an oval shape. The porosity of extraction beads may allow the target material to bind to internal and external surfaces of the extraction beads while other materials included in the brine may be suspended between the beads.

A stripping agent or solvent (e.g., water) may be used to flush materials included in the brine out of the extraction chamber according to a target profile where target materials continue to be ionically bound to ions of the target material (e.g., lithium) while other materials are flushed from the extraction column. The extractant material may be regenerated by flushing the bed with the stripping agent or solvent (e.g., water). This stripping agent may solubilize the target ions into solution after most other material included in the brine are flushed out of the extraction materials. In one exemplary case, a highly selective absorbent may be utilized as the extractant, and a water/aqueous solution may be utilized as the stripping solution.

The systems and apparatus (e.g., extraction apparatus such as extraction column, extraction vessel, etc.) of the present disclosure may be mobile such that an extraction system can be placed on a truck or be on a mobile platform. As such, the present disclosure can provide simpler extraction techniques at remote locations.

FIG. 1 illustrates an example apparatus 100 (e.g., distributor or dispensing array) that may be used to distribute fluid within an extraction column. Distributor 100 of FIG. 1 may be used to distribute fluid to an extraction column evenly across a cross-section of the extraction column by including manifold 110 and a plurality of sprinkler arms 120. In some examples, manifold 110 may provide fluid to a plurality of sprinkler arms 120.

In some aspects, an extraction column may include one or more distributors or dispensing arrays 100. For example, an extraction column for brine can include a first distributor for providing brine (e.g., feeding brine) from a brine source and a second distributor for providing a stripping solution (e.g., water) to the extraction column. By providing brine and a stripping solution separately from two distributors, the mixing of the brine and water can be minimized.

While distributor 100 of FIG. 1 has a shape that includes manifold 110 that is perpendicular to sprinkler arms 120, distributors consistent with the present disclosure may have other shapes without departing the scope of the present disclosure. For example, distributors may have a spiral or circular shape.

Figure 2:
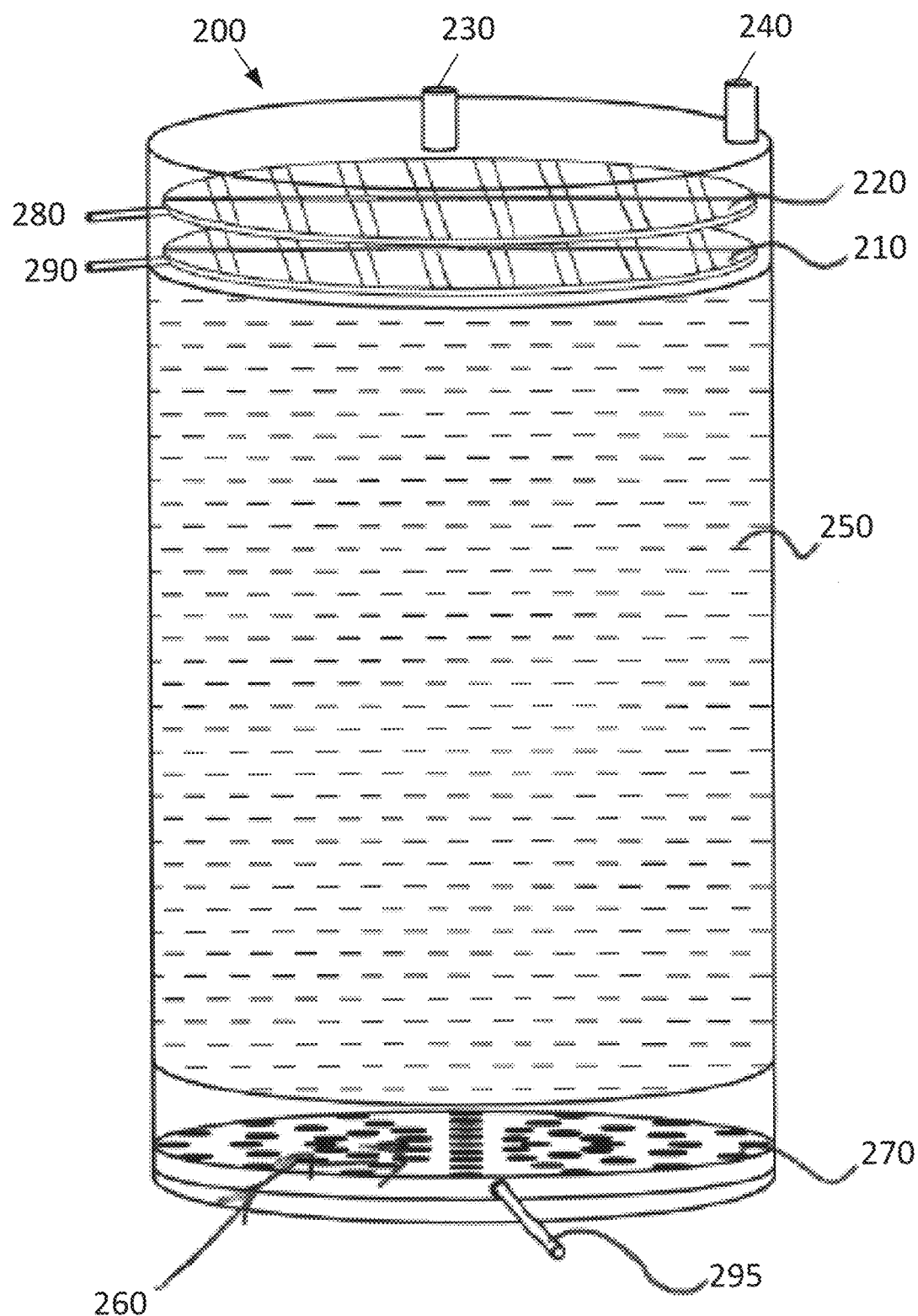
FIG. 2 illustrates an example extraction column of the present disclosure, in accordance with various aspects of the subject technology.

FIG. 2 illustrates an example extraction column 200 of the present disclosure. As illustrated, extraction column 200 has a substantially cylindrical shape. The diameter of extraction column 200 may vary from one inch to greater than six feet. In some instances, extraction column 200 may have diameters as great as twelve feet or more. In some examples, extraction column 200 is designed such that the height is greater than the diameter. In some aspects, extraction column 200 may be a closed pressure vessel with a domed top and bottom. While example extraction column 200 is a substantially cylindrical tube, any applicable shape of extraction vessel (e.g., extraction column or tube) can be used without departing the scope of the present disclosure.

In some examples, extraction column 200 of FIG. 2 may include brine distributor 210 and stripping solution distributor 220 (similar to distributor 100 as illustrated in FIG. 1). As shown in FIG. 2, brine distributor 210 and stripping solution distributor 220 may be located in a head space (an upper portion) of extraction column 200. In some examples, arms of brine distributor 210 may be positioned perpendicular to arms of stripping solution distributor 220. By providing distributors for each of the two fluids (e.g., brine and stripping solution), mixing of the constituent solutions may be further avoided.

The extraction column 200 may include an area where extraction materials/extractant (e.g., extraction beads) 250 are located. The area where the extraction materials 250 are located may be referred to as the media bed of extraction column 200. As previously described, extraction materials 250 can include a solid material that removes or absorbs target ions (e.g., lithium ions in brine) and can be regenerated by flushing the media bed with a solvent (e.g., stripping agent such as water) that solubilizes the target ions into solution.

The sorbent material may be a solid material and/or a liquid material. The sorbent material may be changed based on material type targeted for extraction. For example, a type of sorbent material may vary depending on whether lithium or uranium are being extracted. Examples of sorbent materials include, yet are not limited to: one or more of lithium aluminate, aluminum-based material, aluminum-oxygen based materials, manganese, manganese oxides, gallium-based materials, cobalt oxides, transition metal oxides, transition metal sulfides, transition metal phosphates, aluminum phosphates, gallium phosphates, antimony oxides, antimony phosphates, tin oxides, tin phosphates, silicon-based materials, germanium-based materials, transition metal silicates, aluminum-gallium silicates, germanium, tin, and/or antimony silicates, sulfides, titanates, indiumates, indium tin oxides, mixed transition metal oxides and/or phosphates, organophosphates, polymers containing organophosphates, polyethers, ion-exchange resins, bohemite-based materials, aluminum-oxyhydroxides, activated alumina, and/or other materials that absorb a desired constituent in the brine.

The extraction column 200 may include structure 260 that controls flow of fluid through the bottom portion of extraction column 200. Structure 260 may be aligned along plane 270. In certain instances, structure 260 may include or be comprised of an array of drain balls (e.g., spherical-shaped balls) that have holes or slots that allow fluid to pass through the balls. Such holes may be of any shape, for example the holes may have a circular, oval, rectangular, or other shape. The shape and/or size of these holes may be selected to produce a balanced volumetric load or a same chromatographic flow (uniform flow). This may help mitigate turbulence and/or smearing of flows through extraction column 200. The presence of structure 260 in the bottom portion of extraction column 200 may also help facilitate uniform flow of fluid through the extraction materials 250 located in the media bed of extraction column 200. This may help maintain a bright-line interface (help minimize smearing) between brine and the stripping solution in extraction column 200.

In some implementations, extraction column 200 can include one or more sensors (e.g., a radar sensor, a float sensor, an acoustic sensor, etc.). Sensor 230 may be a "guided wave radar" sensor that is located near the top portion of column 200. Sensor 240 may be a "radar" sensor, be a float sensor disposed inside of column 200, or be any type of level sensor known in the art.

The extraction process of the present disclosure as described herein creates a substantially sharp concentration profile (e.g., high ion concentration zone abutting low ion concentration zone with minimal "smear") by utilizing a level control. One goal of the extraction process may include minimizing the cross-mixture of brine and stripping solution (e.g., water) during an extraction process. This may be accomplished in the following manner. When the absorbent is saturated with target ions (e.g., lithium ions), the brine flow may be stopped, and pad gas (e.g., air or nitrogen) may be injected into extraction column 200. The pad gas may push the brine level down until the top of the brine aligns with the top of the media bed where extraction materials 250 are located. This may be accomplished using one or more sensors (e.g., sensor 230 and/or sensor 240) that determine the location of the top of the media bed and the top of the brine.

As mentioned above, sensor 230 can take the form of a "guided wave radar" that employs a physical probe that sends current down to determine the liquid level by detecting the position of the top of the liquid (e.g., brine or water). Sensor 240 may be a "radar sensor" that uses high-frequency radio waves (e.g., microwaves) to measure the distance to the surface of the liquid. The rate of change of the liquid level can be determined from iterative readings by the radar or other sensor (e.g., sensor 240). When this rate of change "stops," it is known that the top of the brine is at the top of the media bed where extraction materials 250 are located. At that point, when the top of the brine aligns with the top of the media, a flow of stripping solution (e.g., water) may be initiated. Continued flow of the stripping agent will regenerate the media bed. When the extractant (absorbent) is regenerated, the process may be repeated.

In some examples, an additional instrument can be utilized in conjunction with sensors 230 and 240, for example, a "Coriolis Meter". Coriolis flow meters work on principals of the Coriolis effect, first described by G. G. Coriolis, who identified that that bodies moving on the surface of the Earth tend to drift sideways because of the Eastward rotation of planet Earth. In the Northern Hemisphere, the deflection is to the right of the motion, and in the Southern Hemisphere, the deflection is to the left. When a fluid is flowing through a pipe and it is subjected to Coriolis acceleration, for example, by rotating the pipe, an amount of deflecting force generated by the Coriolis effect will be a function of the mass flow rate of the fluid. When a pipe is rotated around a point while liquid is flowing through that pipe, fluid flowing through the pipe will generate an inertial force acting on the pipe that is at right angles to the direction of the fluid flow. Measurements of this force may be used to identify a mass flow rate of the fluid flowing through the pipe amongst other things. For example, the Coriolis Meter may be used to detect flow (rate and/or volume), temperature, and density (among others) of a liquid. Output from the Coriolis meter may identify a density of fluids exiting an extraction vessel/column. Changes in an output density may be used to identify when an output flow changes from densities of a brine source to densities of a combination of water and target materials. Another change in density may be identified when the output stream is comprised of the stripping agent and little to no (less than a threshold concentration) of a target material (e.g., lithium or uranium). As such, constituent components included in a flow stream may be identified based on liquid density. Other sensors used in an extraction system may include flow sensors or pressure sensors. Knowing the density of the solution as it leaves the vessel, as well as at every phase of an extraction cycle may allow for extractions of target materials to be performed more efficiently. Other types of sensing devices may be coupled to inputs and/or output(s) of extraction column 200. For example, a mass spectrometer, a nuclear magnetic resonance (NMR) testing device (e.g., a Nanonord NMR device), or a chromatograph may be used to measure constituent components included in a fluid output from extraction column 200. In certain instances, measurements output from a Coriolis Meter may be validated based on chromatography tests, mass spectrometer tests, and/or NMR tests. It may also be possible to couple an output stream to a Coriolis Meter, an NMR, a mass spectrometer, and/or chromatograph. Results from one or more of such tests may be provided to a control system that automatically controls operation of extraction column 200.

In operation, brine may be provided to brine distributor 210 via brine input line 290 and a stripping solution (e.g., water) may be provided to stripping solution input line 280 coupled to stripping solution distributor 220. The brine input line 290 and/or stripping solution input line 280 may include a valve to control the flow of brine and/or stripping solution. As mentioned above, a pad gas (e.g., air, nitrogen, etc.) may be provided to the extraction column 200. Fluid may be drained out of extraction column 200 via output line 295 (e.g., discharge line, discharger, etc.).

As a fluid containing the desired constituent (also referred to as "brine" herein) flows from input line 290 based on operation of one or more valves (e.g., a valve coupled to input line 290 and output line 295) are opened to allow for brine to flow through column 200. Brine may be allowed to flow through input line 290 until sorbent material 250 has started absorbing the desired constituent component included in the brine. When the extraction (e.g., sorbent) material reaches near saturation with a desired constituent component in the brine, a stripping agent may be provided to extraction column 200. This means that when the desired concentration of the constituent component has been absorbed by the sorbent extraction material 250, a second fluid flow may be provided to input line 280 by switching appropriate valves. In certain instances, this second fluid flow may be fresh water. As the second fluid flow begins to move through column 200, the interface between the brine and the second fluid (the brine-water interface) will move downward along the length of the column. As the interface passes a given level in column 200, ions that have been captured in the sorbent extraction material 250 may lose energy and leave the absorption site. This may include the target constituent component entering the flow through column 200. In the case of lithium, the lithium ion may be attracted to several water molecules in the second fluid. This may place the lithium ion at a lower energy state in the second fluid than lithium ions that remain absorbed by (attached to) the sorbent extraction materials 250. As such, the lithium is "flushed" or removed from the sorbent materials 250.

In another aspect of the present disclosure, once sorbent material in column 200 has been completely saturated, a second ("dilute") flow is introduced into column 200. The dilute flow may comprise a dilute solution of the desired constituent dissolved in water. By maintaining a substantially constant pressure within column 200, the structural integrity of the sorbent material in column 200 may be maintained within a threshold range. The removal of the brine fluid may reduce the impurities that are present when the desired constituent component is removed from column 200. While column 200 is being filled with the dilute flow, a lag tank may be being filled with brine flow via input line 290. Other valves and/or mechanisms in an extraction system may be used to control the flow of brine and/or dilute flow into one or more columns 200. Such valves and/or flows may be managed by an automatic control system.

In certain instances, multiple extraction columns may be coupled in a sequential or "daisy-chain" configuration. As such, portions of target material that exit a first extraction column with brine may be captured by sorbent materials in a second or subsequent extraction column.

In some instances, the drain balls mentioned above may be aligned in the plane 270. Each ball may be placed such that each respective ball will collect the same amount of fluid, no matter where the ball is in the array. In some examples, each ball may be connected to a drain tube that is attached to output line 295. The drain tubes attached to structure 260 may have the same length so that the solution from each tube arrives at the discharge line (e.g., output line 295) in a correct order. The flow of fluid through each of these balls may be at essentially or substantially the same velocity and/or volumetric flow rate. As such, the velocity and/or the volumetric flow rate variance between different balls may be within a threshold margin of a target velocity and/or volumetric flow rate. In some aspects, drain tubes may be designed to transfer fluids at the same volumetric rate and/or velocity. In some implementations, drain tubes with different shapes may be included in an assembly such that transfer rates (velocity and/or volumetric flow rate) of fluid through the tubes are matched. In certain instances, one or more of the drain tubes may have a shape that corresponds to a cycloid. In other instances, a tube may have some portions that have a curved path and other portions that have a linear path.

Figure 3A:
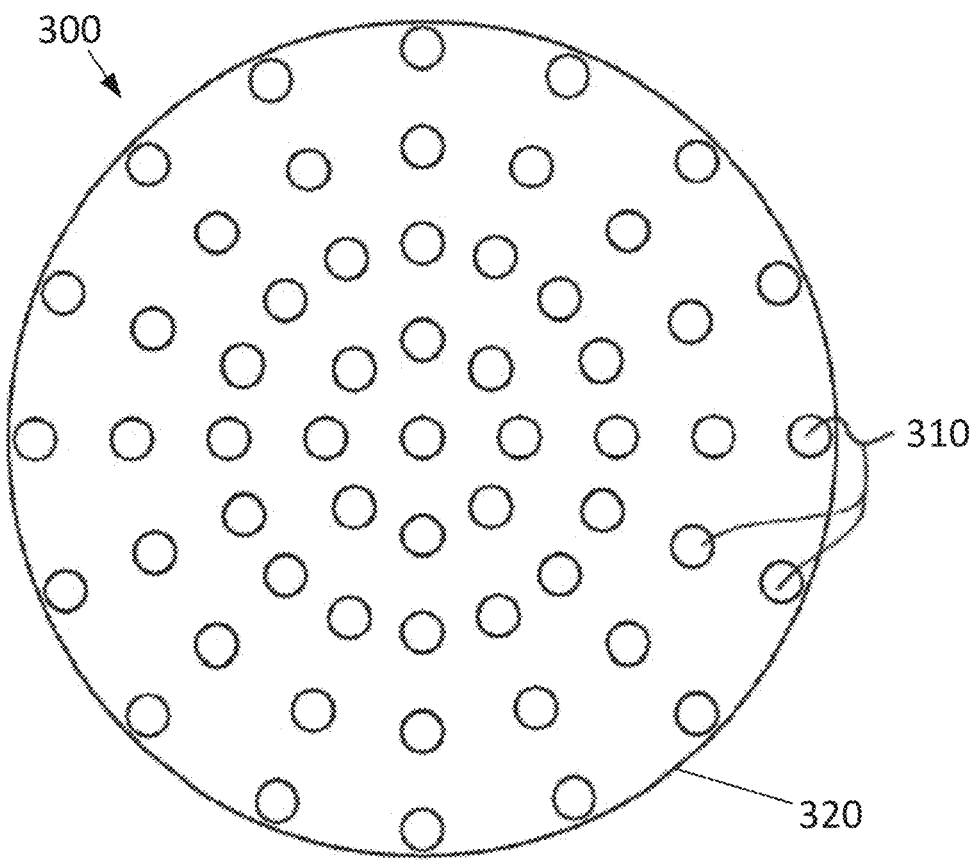
FIGS. 3A and 3B illustrate an example array of balls that may be used to facilitate passage of a flow of fluid in a controlled way, in accordance with various aspects of the subject technology.
Figure 3B:
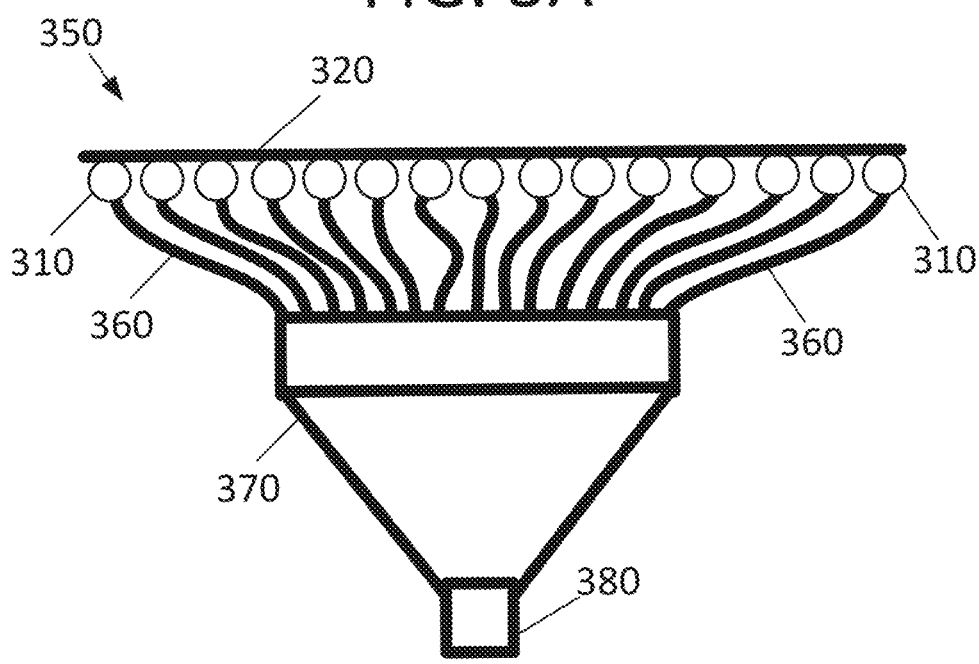

FIGS. 3A and 3B illustrate an example array of balls that may be used to facilitate passage of a flow of fluid in a controlled way. As illustrated in FIGS. 3A and 3B, balls 310 are arranged along plane 320. The balls 310 may include holes or slots that are configured to pass fluid. FIG. 3A includes a top view 300 and FIG. 3B includes a side view 350 of a structure where fluids move from a media bed through balls 310, tubes 360, adapter 370, and output line 380. Such structures may facilitate a laminar flow of fluids through a media bed of an extraction vessel (e.g., extraction column 200). Laminar flow through the media bed may also be facilitated based on extractant beads of the media bed having a sphericity value within a specified tolerance (e.g., 0.85±5%).

Internal portions of these balls 310 and tubes 360 may be referred to as drain channels (or channels) through which fluids flow during an extraction process. While the use of balls and tubes is discussed above, other structures may be used to control fluid flow through channels located in the bottom portion of an extraction vessel. Such structures may be machined, molded, or may be assembled from parts. No matter how a particular drain structure is made, it may be made such that each respective channel passes fluid at the same volumetric rate and/or velocity.

Figure 4:
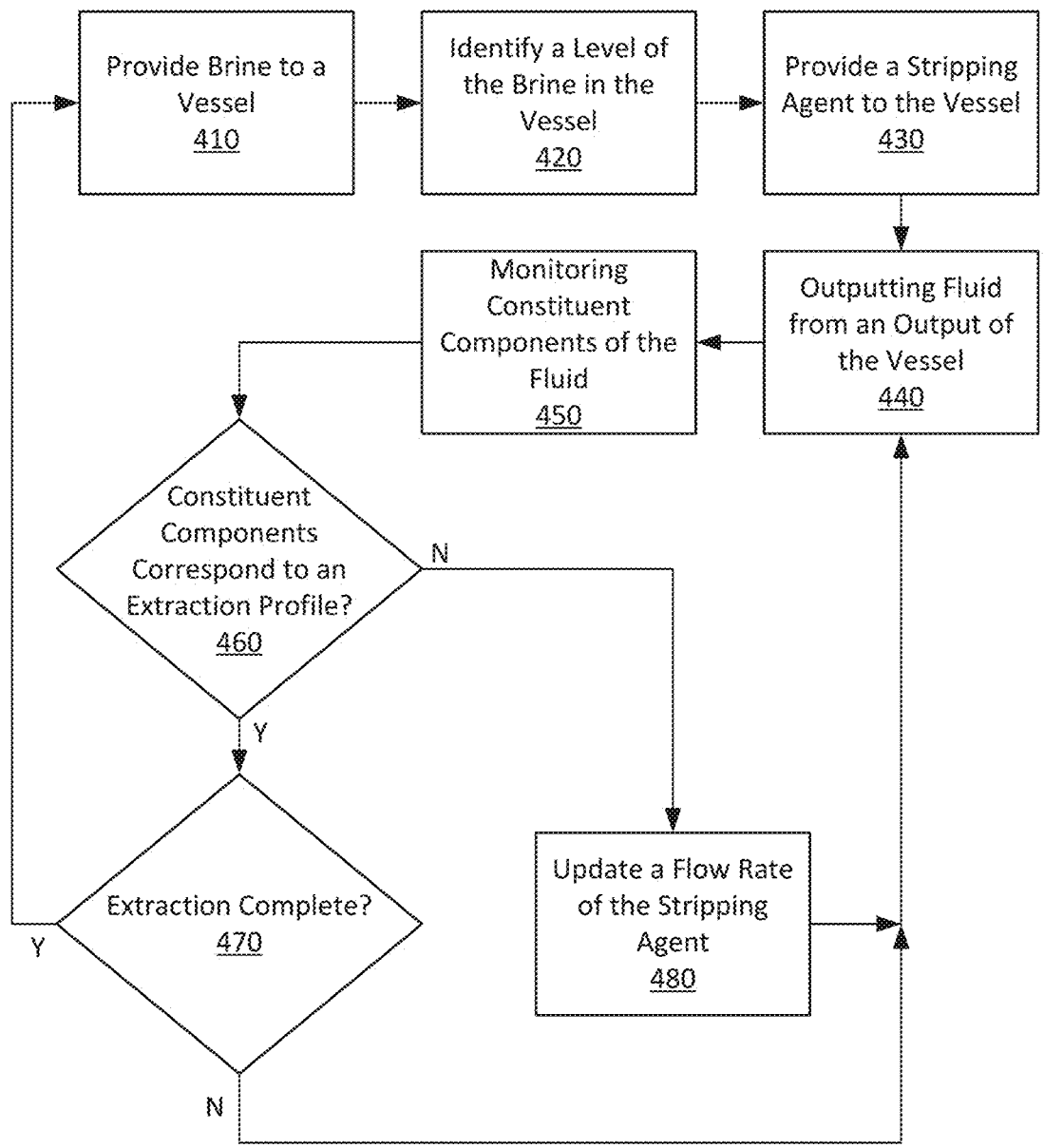
FIG. 4 illustrates a flowchart of an example method of extracting a target material from brine, in accordance with various aspects of the subject technology.

FIG. 4 illustrates a flowchart of an example method of extracting a target material from brine. At block 410, brine may be provided to an extraction vessel (e.g., extraction column 200 as illustrated in FIG. 2). This extraction vessel may include the media bed of extractant material (e.g., extraction materials 250) discussed in respect to FIG. 2.

At block 420, one or more level sensors (e.g., sensor 230, sensor 240 as illustrated in FIG. 2) contained within or attached to the vessel may be used to identify the level of the brine in the vessel. When the level sensed by the level sensor corresponds to a full vessel, the extractant material included in the media bed of the vessel may be surrounded by brine. When the extractant material included in the vessel ionically binds to a target material included in the brine, the target material included in the brine may bind to internal and/or external surfaces of the extractant material when the brine contacts the extractant material. As such, beads of extractant material may "absorb" the target material. Since the extractant material may only have an affinity to ionically bind to ions of one material (e.g., a target material such as lithium) in the brine, other materials in the brine will be disposed around the extractant material when the target material is ionically bound to the extractant material.

At block 430, a stripping agent may be provided to the vessel. As mentioned above, this stripping agent may be water or an aqueous solution. At block 430, an output of the vessel may be opened to allow fluid in the vessel to drain from the vessel.

At block 440, fluid may be output from the vessel via an output. Initially, when the stripping agent is provided to the vessel, the fluid output from the vessel will contain relatively high concentrations of one or more materials other than the target material.

One or more sensing devices of a sensing system may be coupled to an output line (e.g., output line 295, output line 380, discharger, etc.) of the vessel and these sensing devices may be used to identify densities of specific materials included in an output flow at a given moment in time. As mentioned above, sensing devices may include a Coriolis meter, a mass spectrometer, and/or a chromatograph (e.g., an ion chromatograph). As such one or more sensing devices may be used to identify constituent components of sodium, calcium sulfate, magnesium potassium, boron, lithium, uranium, or other materials.

At block 450, constituent components in the fluid may be monitored as the fluid outputs the vessel. Ideally, all materials other than the target material will drain from the vessel before the target material exits the vessel. Since this may not be practically possible, methods and apparatus of the present disclosure may be configured to remove as much of the other materials from the vessel before some level of target materials exit the vessel in an extraction cycle. This may be true even when the stripping agent acts to regenerate or clean the extractant material. The ionic bonds that bind the target material to the extractant material may be stronger than forces imposed by movement of the stripping solution down the extraction vessel. As such, the constituent components of fluid output from the vessel may initially be dominated by the one or more other materials included in the brine. As the flow of the stripping agent is continued, the target materials bound to the extractant material may be released from the extractant material. At this time, one or more things may be monitored by a control system.

In some examples, the level of fluid in the vessel may be monitored by the control system receiving data from the level sensor discussed in respect to block 420. An input flow rate of the stripping agent, an output flow rate of the fluid exiting the vessel, and/or constituent components of the fluid output from the vessel may be monitored. The control system may also receive data from sensing devices and this data may be used to control flow rates of the extraction process to minimize mixing of the target material with other materials in the brine.

A determination may then be made at block 460 as to whether the constituent components included in the output fluid correspond to an extraction profile. Such an extraction profile may dictate that concentrations of the one or more other materials in the fluid be above a first threshold level when a concentration of the target material is below a second threshold level for at least an initial portion of an extraction process. Alternatively, or additionally, an extraction profile may identify one or more of a rate of change of the measured constituent components or a target cross-over ratio value of the extraction process as discussed in respect to FIGS. 5A and 5B below.

As such, techniques of the present disclosure may be used to control an extraction and cleansing process by an automated control system. When it is determined at block 460 that the constituent components included in the output fluid do not correspond to the extraction profile, the flow rate of the stripping agent may be updated at block 480. This may include decreasing the flow rate of stripping agent when measured values of the target material are greater than expected at a given point in a current extraction cycle. Alternatively, this may include increasing the flow rate of the stripping agent according to a set of extraction rules.

When determination block 460 identifies that the constituent components included in the fluid output from the vessel correspond to the extraction profile, an evaluation may be performed at determination block 470. As such, at block 470 a determination may be made as to whether a current extraction cycle is complete, when no, program flow may move to block 440 where output of the fluid from the vessel is continued. When a determination is made at block 470 that the extraction is complete, the method may continue where the vessel is refilled with brine at block 410. Because of this, the actions discussed in respect to FIG. 4 are representative of a continuous extraction process that may be controlled by an automated control system.

Figure 5A:
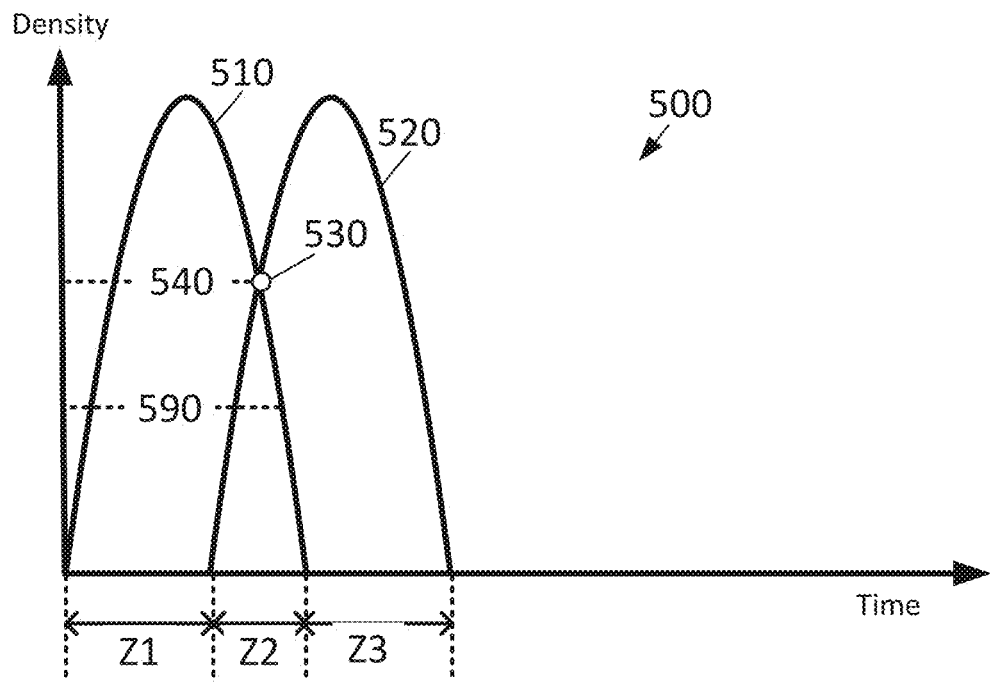
FIGS. 5A and 5B illustrate example graphs of extraction curves, in accordance with various aspects of the subject technology.
Figure 5B:
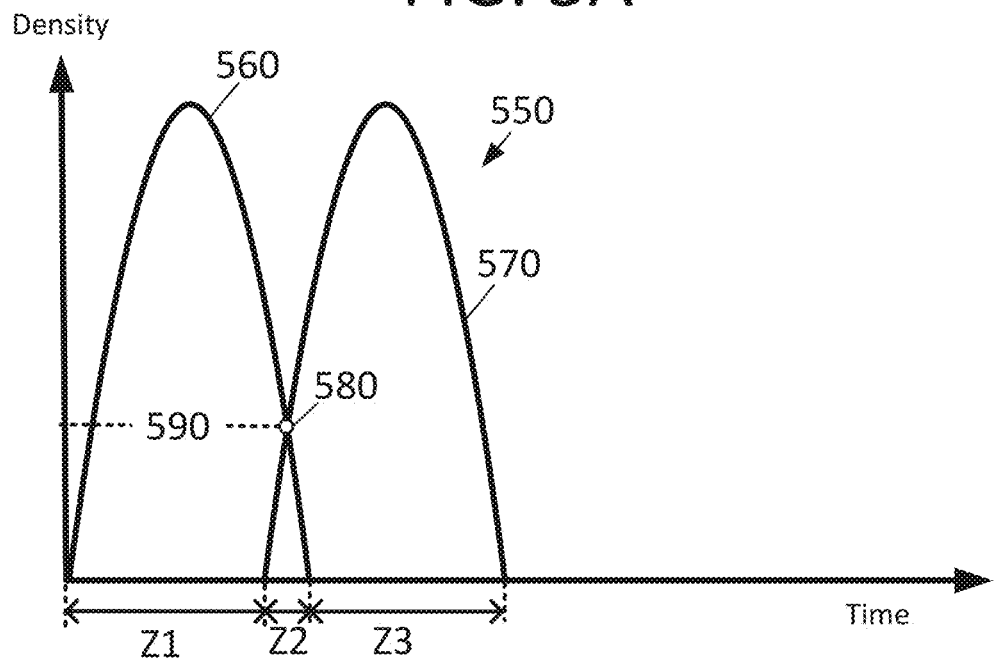

FIGS. 5A and 5B illustrate two graphs (500 & 550) of extraction curves. Each graph 500, 550 of FIGS. 5A and 5B includes a vertical axis of density and a horizontal axis of time. When a target material (e.g., lithium) is extracted from brine that includes the target material and one other materials, masses of the one or more other materials may be output from an output of an extraction vessel (e.g., extraction column 200) at over an initial period of time while target material(s) are still bound to the extraction materials (e.g., extraction materials 250). At some point during the extraction process, masses of the target material will be released from the extraction materials. A goal of the extraction process may be to output most of the mass of the other materials included in the extraction vessel before a threshold measure of mass of the target material is output from the extraction vessel.

Graph 500 of FIG. 5A shows that in a first extraction process, that densities of the other materials are output from the extraction vessel according to curve 510 and that densities of the target materials output from the extraction vessel according to curve 520. The horizontal axis of graph 500 is partitioned into three zones Z1, Z2, and Z3. The one or more other materials are output from the vessel during zones Z1 and Z2 and the target materials are output from the vessel over zones Z2 and Z3. Note that in graph 500, the two curves 510 and 520 overlap during zone Z2 in a manner where a significant percentage of total target material output from the vessel is output when the other materials are also output from the vessel. Because of this, the extraction process of graph 500 is inefficient. Point 530 of graph 500 is where curve 510 and curve 520 intersect or "cross-over" each other, as such point 530 may be referred to as an intersection or cross-over point. Density values of both the one or more other materials and the target material may be identified by projecting horizontal line 540 from cross-over point 530 to the vertical density axis of graph 500. Note that line 590 in graph 500 corresponds to a similar cross-over point 580 from graph 550, line 590 is included in graph 500 for comparison as reviewed below.

Graph 550 of FIG. 5B shows that in a second extraction process, that densities of other materials are output from the extraction vessel according to curve 560 and that densities of the target materials (e.g., lithium chloride) output from the extraction vessel according to curve 570. The horizontal axis of graph 550 is partitioned into three zones Z1, Z2, and Z3. As shown, the one or more other materials are output from the vessel during zones Z1 and Z2 and the target materials are output from the vessel over zones Z2 and Z3. Note that in graph 550, the two curves 560 and 570 overlap during zone Z2. Note also that zone Z2 of graph 550 is much smaller than zone Z2 of graph 550, which indicates that the mixing of target materials with other materials in output fluid is much less in the second extraction process as compared to the first extraction process. Point 580 is an intersection or a "cross-over" point and line 590 projected from point 580 to the vertical density axis of graph 550 may be used to identify the density of target materials and other materials output from the extraction vessel at cross-over point 580.

As mentioned above, line 590 appears in graph 500 such that the density values of cross-over point 530 of graph 500 may be compared with density values of point 580 of graph 550. This shows that the extraction process of graph 500 includes more mixing of target materials with other materials as compared to the extraction process of graph 550. The curves of graph 500 and 550 correspond to relative masses of other materials versus target materials released from an extraction bed volume during an extraction process. Here, a total mass of other materials included in a volume of brine corresponds to the area under curves 510 and 560 and a total mass of the target material in that volume corresponds to the area under curves 520 and 570. In zone Z2 of graph 500, approximately 40% of the total mass of target material included in the volume of brine is mixed with other materials. The overlapped region, zone 2 of graph 550 only includes about 8% of the total mass of the target material included in the volume of brine. For the reasons discussed above, the extraction process of graph 550 is much more efficient than the extraction process of graph 500. Note that volumetric densities may be measured in milligrams per cubic centimeter or a portions of a bed volume. Note also that the curves of FIGS. 5A and 5B may correspond to materials separated from a bed volume of extractant material per unit time (e.g., bed volume per minute).

Techniques of the present disclosure may include disposing of the fluid output during zone Z1 of the processes of graph 500 and 550, performing a secondary extraction on materials output from the vessel during zone Z2, and providing relatively pure target material for use by other processes during zone Z3. Fluid output during zone Z1 may be processed to remove other materials. Alternatively, fluid output during zone Z1 may be pumped underground or otherwise disposed of.

Objectives of the present disclosure may be to tune extraction processes iteratively. This may include controlling the flow rate of a stripping agent such that more of the other materials are output from the extraction vessel sooner and/or may include controlling the flow rate of the stripping agent to control the placement and shape of a curve that plots output of the target material from the extraction vessel. Ideally, the mass of other materials would reduce to a zero concentration before masses of the target material output by the extraction vessel would begin increasing, such a process would have a "cross-over" point density of zero. As mentioned above, this may be impractical or impossible. As such, a goal may be to minimize masses of other materials that are mixed with target materials in an output stream. This means that the more that curve 570 can be shifted right relative to curve 560 will tend to lead to greater extraction efficiency. The sharper the peak of a target material curve is also desirable. Note that curve 570 is narrower than curve 520 and that curve 570 has a peak that is higher than curve 520.

A number of characteristics may be indicative of a more desirable extraction process as compared to a less desirable extraction process. Such characteristics include, yet are not limited to, a smaller overlap Z2 zone, a rate at which non-target materials included in the brine are output from a vessel reduce (e.g., a rate change that corresponds to the negative slope of curve 560 at cross-over point 580 or a previously observed rate of reduction), a rate at which target materials included in the brine are output increases (e.g., a slope/rate-of-change of curve 570 at cross-over point 580), and a relative minimum value of cross-over point density. One or more of these characteristics may be used as factors when an extraction process is controlled.

Furthermore, one or more of these factors may be used by a machine learning (ML) process when an apparatus identifies a preferred extraction profile. In one instance, the relative minimum value of cross-over point density may be a target value used by a control unit when the control unit maintains a profile of a current extraction. This may include, identifying constituent components currently exiting an extraction vessel, projecting material rates of change output from the vessel as a function of one or more flow rates, identifying whether material rates of change output from the vessel conform to the projections, and adjusting flow rates based on whether the material rates of change output from the vessel conform to the projections and/or a previously observed extraction profile.

A technique of the present disclosure may measure constituent components of a fluid output via an output of a vessel when a stripping agent is provided to the vessel, perform evaluations on the measures of the constituent components included in the fluid, and control the flow of the stripping agent to maintain an extraction profile that identifies at least one of a rate of change of the measured constituent components or a target cross-over ratio value of the extraction process. This target cross-over point or cross-over ratio value may correspond to a concentration of one or more other materials that is equal to a concentration of the target material output from the vessel at a moment in time. Rates of change of the extraction profile may include a rate of reduction of the one or more other materials output from the vessel and/or a rate of change of increase of the target materials output from the vessel. An increase in a rate of reduction of the one or more other materials output at a cross-over point, the rate of increase of the target material at or after the cross-over point, or a reduction of the cross-over point from one extraction to a next extraction are non-limiting examples of metrics or factors that may be used it identify an improved extraction efficiency, for example, by operation of a machine learning (ML) process.

Utilizing the distribution system and practices described above, the process may start with a sharp, flat interfacial profile in the media bed. To improve efficiency, brine/water mixing may be substantially prohibited by the bed that is packed with uniform fine particles of extractant material (e.g., extractant beads of a specified sphericity), it can be expected that the brine water profile at the bottom of the bed will be essentially the same as it was at the top of the bed. One goal may be to as completely as possible collect the brine water gradient at the bottom of the column. Different solutions output from the extraction vessel may be uniformly collected and transferred into a discharge pipe at the bottom of the column, in the same order that they were introduced into the bed. To accomplish such collection, an array of specially designed spherical slotted balls may be used as discussed in respect to FIG. 3.

In accordance with the technology disclosed above, very sharp gradients are achieved. For example, a gradient in the shape of curve 570 of FIG. 5B. Relatedly, the so-designed columns may be described in a dimensionless term of "bed volumes." Accordingly, experiments can be conducted in the laboratory with a one inch by eighteen-inch column. The gradient from one of those experiments will accurately reflect the gradient of a three foot by six-foot column. Following the steps described above, dramatic improvements have been demonstrated in gradient control. Initially, the laboratory columns generated gradients that were on the order of fifteen percent to twenty percent of a bed volume. By paying attention to these principles, gradients that are less than five percent of a bed volume are achieved. More importantly, during testing of the three-foot columns, gradient spread was achieved that was around five percent of a bed volume.

Figure 6:
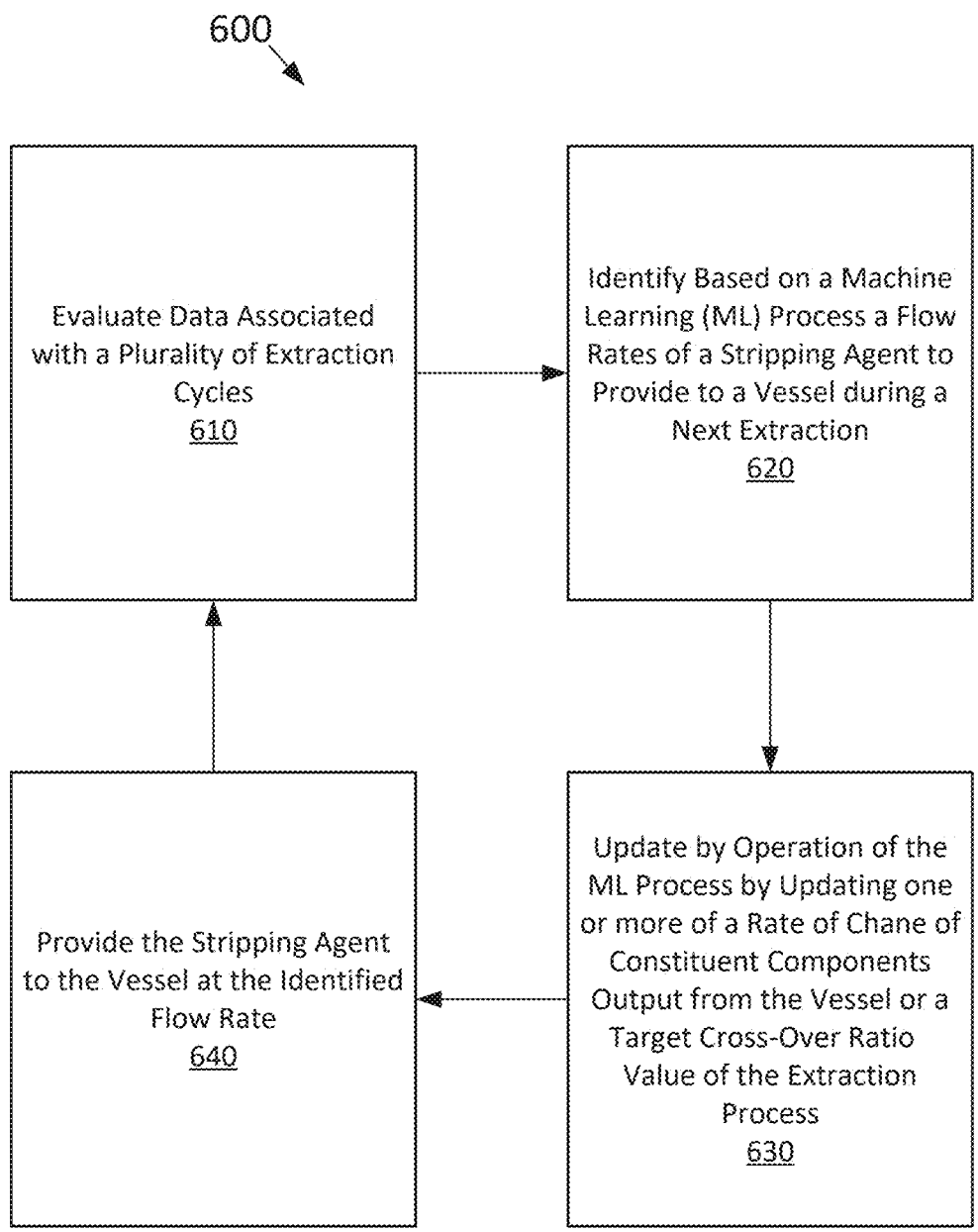
FIG. 6 illustrates a flowchart of an example extraction process using machine learning, in accordance with various aspects of the subject technology.

FIG. 6 illustrates a flowchart of an example extraction process 600 when a machine learning (ML) process is implemented. At block 610, data associated with a plurality of different extraction cycles may be evaluated. This data may have been collected when the different extraction cycles were performed. Variables and other data tracked in this data may identify relative densities of materials included in a brine flow, input flow rates, temperatures, pressures, temperature changes, pressure changes, output flow rates, rates-curves-percentages associated with other materials and target materials output from a vessel (e.g., rates of change of constituent components over time), input flow rates (e.g., brine flow rate and/or a stripping agent flow rate), data that identifies cross-over points for each extraction, data from which an efficiency of each respective extraction can be identified, extraction cycle time, and/or durations of one or more parts of the extraction cycle (e.g., Z1, Z2, and Z3 duration times discussed in respect to FIGS. 5A and 5B).

An extraction process may be controlled by controlling flow rates of the stripping agent provided to an extraction vessel. The flow rate of the stripping agent may be controlled to maintain an extraction profile. This profile may specify a rate of reduction of concentrations of the one or more other materials in a fluid exiting the extraction vessel (e.g., the negative slope of curve 560), a rate of increase of a concentration of the target material in the fluid (e.g., the positive slope of curve 570), and/or the minimum cross-over point density value discussed above. The ML process mentioned above may use a previously observed minimum cross-over point value as a target value to meet or beat.

After performing many extractions, an apparatus performing the ML process may identify process characteristics that correspond to the most efficient extraction process observed to date. Process variables may be changed to see whether a current observed minimum cross-over point value can be lowered. This may allow the ML process apparatus to identify target operating characteristics that should perform a most efficient extraction. While this may be true, the ML process may still be tuned in instances when the efficiency of new extraction does not correspond to a previous extraction efficiency or a projected extraction efficiency. The ML process may be tuned to account for process variables. Such variables may, for example, include relative densities of materials included in a brine flow, input flow rates, temperatures, pressures, temperature changes, pressure changes, and/or output flow rates.

At block 620, an ML process may identify flow rates of the stripping agent to provide to a next extraction cycle. This may include identifying one or more flow rates that previously provided a maximum observed extraction efficiency or that minimized mixing of target materials with other materials included in the brine.

At block 630, operation of the ML process may be updated by changing a flow rate (e.g., a flow rate of the stripping agent is provided to a vessel), changing an operational pressure, or by changing one or more other process variables.

At block 640, the stripping agent may be provided to the extraction vessel according to the updates performed at block 630. Additional data may be collected at block 640 as a current extraction cycle is performed. Program flow may then move back to block 610 where the data collected from this extraction cycle may be reviewed in evaluations that compare previously collected data with this current data. This process may be repeated iteratively until a machine learning model is sufficiently trained.

A machine learning (ML) apparatus of the present disclosure may include any type of ML apparatus, for example, a neural network or one or more processors that execute instructions of a computer model out of a memory.

Figure 7:
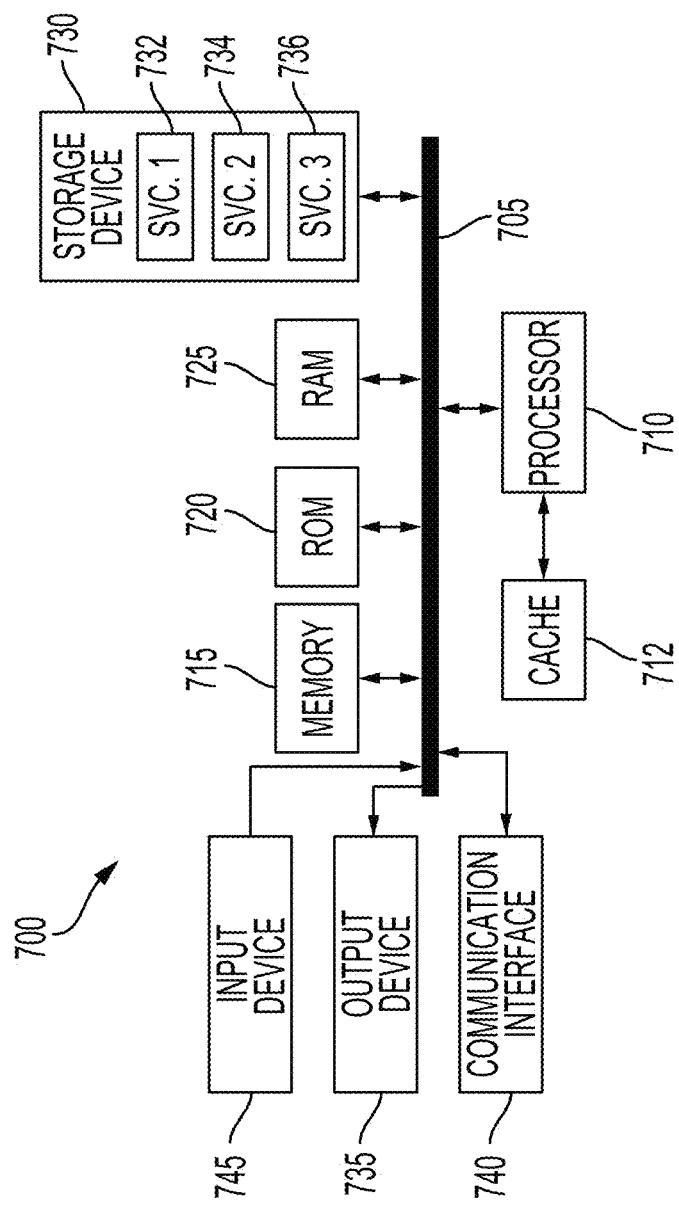
FIG. 7 illustrates an example computing device architecture, which can be employed to perform any of the systems and techniques described herein.

FIG. 7 illustrates an example computing device architecture which can be employed to perform any of the systems and techniques described herein. In some examples, the computing device 700 architecture can be integrated with tools described herein. The components of the computing device architecture 700 are shown in electrical communication with each other using a connection 705, such as a bus. The example computing device architecture 700 includes a processing unit (CPU or processor) 710 and a computing device connection 705 that couples various computing device components including the computing device memory 715, such as read only memory (ROM) 720 and random access memory (RAM) 725, to the processor 710.

The computing device architecture 700 can include a cache of high-speed memory connected directly with, in close proximity to, or integrated as part of the processor 710. The computing device architecture 700 can copy data from the memory 715 and/or the storage device 730 to the cache 712 for quick access by the processor 710. In this way, the cache can provide a performance boost that avoids processor 710 delays while waiting for data. These and other modules can control or be configured to control the processor 710 to perform various actions. Other computing device memory 715 may be available for use as well. The memory 715 can include multiple different types of memory with different performance characteristics. The processor 710 can include any general-purpose processor and a hardware or software service, such as service 1 732, service 2 734, and service 3 736 stored in storage device 730, configured to control the processor 710 as well as a special-purpose processor where software instructions are incorporated into the processor design. The processor 710 may be a self-contained system, containing multiple cores or processors, a bus, memory controller, cache, etc. A multi-core processor may be symmetric or asymmetric.

To enable user interaction with the computing device architecture 700, an input device 745 can represent any number of input mechanisms, such as a microphone for speech, a touch-sensitive screen for gesture or graphical input, keyboard, mouse, motion input, speech and so forth.

An output device 735 can also be one or more of a number of output mechanisms known to those of skill in the art, such as a display, projector, television, speaker device, etc. In some instances, multimodal computing devices can enable a user to provide multiple types of input to communicate with the computing device architecture 700. The communications interface 740 can generally govern and manage the user input and computing device output. There is no restriction on operating on any particular hardware arrangement and therefore the basic features here may easily be substituted for improved hardware or firmware arrangements as they are developed.

Storage device 730 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 725, read only memory (ROM) 720, and hybrids thereof. The storage device 730 can include services 732, 734, 736 for controlling the processor 710. Other hardware or software modules are contemplated. The storage device 730 can be connected to the computing device connection 705. In one aspect, a hardware module that performs a particular function can include the software component stored in a computer-readable medium in connection with the necessary hardware components, such as the processor 710, connection 705, output device 735, and so forth, to carry out the function.

For clarity of explanation, in some instances the present technology may be presented as including individual functional blocks including functional blocks comprising devices, device components, steps or routines in a method implemented in software, or combinations of hardware and software.

In some instances, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can include hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific examples and aspects thereof, but those skilled in the art will recognize that the application is not limited thereto. Thus, while illustrative examples and aspects of the application have been described in detail herein, it is to be understood that the disclosed concepts may be otherwise variously embodied and employed, and that the appended claims are intended to be construed to include such variations, except as limited by the prior art. Various features and aspects of the above-described subject matter may be used individually or jointly. Further, examples and aspects of the systems and techniques described herein can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate examples, the methods may be performed in a different order than that described.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The various illustrative logical blocks, modules, circuits, and algorithm steps described in connection with the examples disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the method, algorithms, and/or operations described above. The computer-readable data storage medium may form part of a computer program product, which may include packaging materials.

The computer-readable medium may include memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

Methods and apparatus of the disclosure may be practiced in network computing environments with many types of computer system configurations, including personal computers, hand-held devices, multi-processor systems, microprocessor-based or programmable consumer electronics, network PCS, minicomputers, mainframe computers, and the like. Such methods may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

Although a variety of information was used to explain aspects within the scope of the appended claims, no limitation of the claims should be implied based on particular features or arrangements, as one of ordinary skill would be able to derive a wide variety of implementations. Further and although some subject matter may have been described in language specific to structural features and/or method steps, it is to be understood that the subject matter defined in the appended claims is not necessarily limited to these described features or acts. Such functionality can be distributed differently or performed in components other than those identified herein. The described features and steps are disclosed as possible components of systems and methods within the scope of the appended claims.

Claim language or other language in the disclosure reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

Aspects of the present disclosure include:

Aspect 1: An extraction apparatus comprising: a vessel that contains an extractant material that ionically binds to a target material during an extraction process; a first input valve for selectively directing a brine to the vessel, wherein the brine comprises the target material and one or more other materials and the target material ionically binds to the extractant material when the brine contacts the extractant material; a second input valve for selectively directing a stripping agent stream, wherein the stripping agent stream is provided to the vessel via the second input valve after the brine is provided to the vessel; a discharger that outputs a fluid from the vessel; a monitoring apparatus that measures constituent components of the fluid output via the discharger; and a control unit that controls a flow of the stripping agent stream based on measurements of the constituent components measured by the monitoring apparatus, wherein the control unit controls the flow of the stripping agent stream to maintain an extraction profile that identifies at least one of: a rate of change of the measurements of the constituent components, or a target cross-over ratio value of the extraction process, wherein the target cross-over ratio value corresponds a concentration of the one or more other materials that is equal to a concentration of the target material output from the vessel at a moment in time.

Aspect 2: The extraction apparatus of Aspect 1, wherein the extractant material includes a plurality of beads with a specified sphericity.

Aspect 3: The extraction apparatus of Aspect 1 or 2, further comprising one or more dispensing arrays disposed within the vessel, wherein a first dispensing array is coupled to the first input valve and configured to distribute the brine to an upper cross-sectional portion of the vessel, and a second dispensing array is coupled to the second input valve and configured to distribute the stripping agent stream to the upper cross-sectional portion of the vessel.

Aspect 4: The extraction apparatus of any of Aspects 1 through 3, further comprising a plurality of channels disposed along a bottom portion of the vessel that pass respective portions of the fluid to the discharger.

Aspect 5: The extraction apparatus of any of Aspects 1 through 4, wherein each of a/the plurality of channels passes the respective portions of the fluid within a threshold margin of a same velocity or volumetric flow rate.

Aspect 6: The extraction apparatus of any of Aspects 1 through 5, the extraction apparatus of claim 5, wherein each channel of a/the plurality of channels passes the respective portions of the fluid within the threshold margin of a/the same velocity or a/the volumetric flow rate based on respective lengths or shapes of the plurality of channels.

Aspect 7: The extraction apparatus of any of Aspects 1 through 6, wherein: a first extraction cycle ends after the control unit determines that a concentration of the target material in the fluid peaks and then reduces below a threshold level, and a second extraction cycle begins when the control unit controls a second flow of the brine to the vessel after the concentration of the target material reduces below the threshold level during the first extraction cycle.

Aspect 8: The extraction apparatus of any of Aspects 1 through 7, wherein data associated with a plurality of extraction cycles are evaluated to identify the at least one of the rate of change of the measurements of the constituent components or the target cross-over ratio value of the extraction process.

Aspect 9: The extraction apparatus of any of Aspects 1 through 8, wherein the target material comprises lithium.

Aspect 10: The extraction apparatus of any of Aspects 1 through 9, wherein the vessel is sized such that the extraction apparatus is mobile.

Aspect 11: A method comprising: measuring constituent components of a fluid output via a discharger of a vessel when a brine and a stripping agent are provided to the vessel; assessing measurements of the constituent components included in the fluid; and controlling a flow of the stripping agent to maintain an extraction profile that identifies at least one of: a rate of change of the measurements of the constituent components, or a target cross-over ratio value of an extraction process, wherein the target cross-over ratio value corresponds a concentration of one or more other materials that is equal to a concentration of a target material output from the vessel at a moment in time.

Aspect 12: The method of Aspect 11, further comprising: identifying that a concentration of a target material in the fluid peaks and then reduces below a threshold level during a first extraction cycle, wherein the first extraction cycle ends after the concentration of the target material reduces below the threshold level; and controlling a flow of the brine to the vessel during a second extraction cycle that begins after the concentration of the target material reduces below the threshold level during the first extraction cycle.

Aspect 13: The method of Aspect 11 or 12, further comprising: evaluating data associated with a plurality of extraction cycles based on operation of a machine learning process; identifying based on operation of the machine learning process one or more factors associated with extracting a target material from brine introduced into the vessel; updating at least one of the one or more factors associated with extracting the target material from the brine; and control a subsequent extraction cycle based on the update to the at least one of the one or more factors associated with extracting the target material from the brine.

Aspect 14: The method of any of Aspects 11 through 13, wherein the one or more factors include a flow rate of the stripping agent and operation of the machine learning process includes evaluating one or more different flow rates that the stripping agent was provided to the vessel during a plurality of different extraction cycles.

Aspect 15: The method any of Aspects 11 through 14, further comprising: providing the brine to the vessel when the vessel contains an extractant material, wherein a target material ionically binds to the extractant material when the brine contacts the extractant material; and outputting the fluid via the discharger from the vessel.

Aspect 16: The method of any of Aspects 11 through 15, wherein: the vessel includes a plurality of channels, and respective portions of the fluid are passed to the discharger via respective channels of the plurality of channels.

Aspect 17: A non-transitory computer-readable storage medium having embodied thereon instructions executable by one or more processors to implement a method comprising: measuring constituent components of a fluid output via a discharger of a vessel when a stripping agent is provided to the vessel; performing evaluations on the measures of the constituent components included in the fluid; and controlling a flow of the stripping agent to maintain an extraction profile that identifies at least one of: a rate of change of the measured constituent components, or a target cross-over ratio value of an extraction process, wherein the target cross-over ratio value corresponds a concentration of one or more other materials that is equal to a concentration of a target material output from the vessel at a moment in time.

Aspect 18: The non-transitory computer-readable storage medium of Aspect 17, wherein the one or more processors execute the instructions to: identify that a concentration of a target material in the fluid peaks and then reduces below a threshold level during a first extraction cycle, wherein the first extraction cycle ends after the concentration of the target material reduces below the threshold level; and control a flow of brine to the vessel during a second extraction cycle that begins after the concentration of the target material reduces below the second threshold level during the first extraction cycle.

Aspect 19: The non-transitory computer-readable storage medium of Aspect 17 or 18, wherein the one or more processors execute the instructions to: evaluate data associated with a plurality of extraction cycles based on operation of a machine learning process; identify based on operation of the machine learning process one or more factors associated with extracting a target material from brine introduced into the vessel; update at least one of the one or more factors associated with extracting the target material from the brine; and control a subsequent extraction cycle based on the update to the at least one of the one or more factors associated with extracting the target material from the brine.

Aspect 20: The non-transitory computer-readable storage medium of any of Aspects 17 through 19, wherein the one or more factors include a flow rate of the stripping agent and operation of a/the machine learning process includes evaluating one or more different flow rates that the stripping agent was provided to the vessel during a plurality of different extraction cycles.

What is claimed is:

1. An extraction apparatus comprising:
a vessel that contains an extractant material that binds to a target material during an extraction process;
a first input valve for selectively directing a brine to the vessel, wherein the brine comprises the target material and one or more other materials and the target material ionically binds to the extractant material when the brine contacts the extractant material;
a second input valve for selectively directing a stripping agent stream, wherein the stripping agent stream is provided to the vessel via the second input valve after the brine is provided to the vessel;
a discharger that outputs a fluid from the vessel;
a monitoring apparatus that measures constituent components of the fluid output via the discharger;
a control unit that controls a flow of the stripping agent stream based on measurements of the constituent components measured by the monitoring apparatus, wherein the control unit controls the flow of the stripping agent stream to maintain an extraction profile that identifies at least one of:
a rate of change of the measurements of the constituent components, or
a target cross-over ratio value of the extraction process, wherein the target cross-over ratio value corresponds to a concentration of the one or more other materials that is equal to a concentration of the target material output from the vessel at a moment in time; and
one or more dispensing arrays disposed within the vessel, wherein a first dispensing array is coupled to the first input valve and configured to distribute the brine to an upper cross-sectional portion of the vessel, and a second dispensing array is coupled to the second input valve and configured to distribute the stripping agent stream to the upper cross-sectional portion of the vessel.

2. The extraction apparatus of claim 1, wherein the vessel further comprises an at least one sensor and the at least one sensor identifies the level of brine in the vessel.

3. The extraction apparatus of claim 2, wherein the at least one sensor comprises a radar sensor.

4. The extraction apparatus of claim 3, wherein the radar sensor uses high-frequency radio waves.

5. The extraction apparatus of claim 2, wherein the discharger is coupled to the least one sensor and the at least one sensor identifies the densities of the constituent components of the fluid output.

6. The extraction apparatus of claim 2, wherein the at least one sensor comprises at least one of a nuclear magnetic resonance testing device, a Coriolis meter, a mass spectrometer, or a chromatograph.

7. The extraction apparatus of claim 2, wherein the vessel further comprises a second sensor.

8. The extraction apparatus of claim 2, wherein the at least one sensor comprises a guided wave radar.

9. The extraction apparatus of claim 1, wherein the extractant material includes a plurality of beads having an about 85 percent sphericity.

10. The extraction apparatus of claim 9, wherein the plurality of beads having an about 85 percent sphericity have a larger surface area than a perfect sphere.

11. The extraction apparatus of claim 9, wherein the plurality of beads having an about 85 percent sphericity have a tolerance of plus or minus 2 percent.

12. The extraction apparatus of claim 1, wherein data associated with a plurality of extraction cycles are evaluated to identify the at least one of the rate of change of the measurements of the constituent components or the target cross-over ratio value of the extraction process.

13. The extraction apparatus of claim 1, wherein the target material comprises lithium.

14. The extraction apparatus of claim 1, wherein the vessel is sized such that the extraction apparatus is mobile.

15. The extraction apparatus of claim 1, wherein the volumetric density of the stripping agent is less than the volumetric density of the brine.

16. The extraction apparatus of claim 1, further comprising a sharp gradient between the brine and the stripping agent.

17. An extraction apparatus comprising:
a vessel that contains an extractant material that binds to a target material during an extraction process;
a first input valve for selectively directing a brine to the vessel, wherein the brine comprises the target material and one or more other materials and the target material binds to the extractant material when the brine contacts the extractant material;
a second input valve for selectively directing a stripping agent stream, wherein the stripping agent stream is provided to the vessel via the second input valve after the brine is provided to the vessel;
a discharger that outputs a fluid from the vessel;
a monitoring apparatus that measures constituent components of the fluid output via the discharger;
a control unit that controls a flow of the stripping agent stream based on measurements of the constituent components measured by the monitoring apparatus, wherein the control unit controls the flow of the stripping agent stream to maintain an extraction profile that identifies at least one of:
  a rate of change of the measurements of the constituent components, or
  a target cross-over ratio value of the extraction process, wherein the target cross-over ratio value corresponds to a concentration of the one or more other materials that is equal to a concentration of the target material output from the vessel at a moment in time; and
a plurality of channels disposed along a bottom portion of the vessel that pass respective portions of the fluid to the discharger.

18. The extraction apparatus of claim 17, wherein each of the plurality of channels passes the respective portions of the fluid within a threshold margin of a same velocity or volumetric flow rate.

19. The extraction apparatus of claim 18, wherein each channel of the plurality of channels passes the respective portions of the fluid within the threshold margin of the same velocity or the volumetric flow rate based on respective lengths or shapes of the plurality of channels.

20. An extraction apparatus comprising:
  a vessel that contains an extractant material that binds to a target material during an extraction process;
  a first input valve for selectively directing a brine to the vessel, wherein the brine comprises the target material and one or more other materials and the target material binds to the extractant material when the brine contacts the extractant material;
  a second input valve for selectively directing a stripping agent stream, wherein the stripping agent stream is provided to the vessel via the second input valve after the brine is provided to the vessel;
  a discharger that outputs a fluid from the vessel;
  a monitoring apparatus that measures constituent components of the fluid output via the discharger;
  a control unit that controls a flow of the stripping agent stream based on measurements of the constituent components measured by the monitoring apparatus, wherein the control unit controls the flow of the stripping agent stream to maintain an extraction profile that identifies at least one of:
    a rate of change of the measurements of the constituent components, or
    a target cross-over ratio value of the extraction process, wherein the target cross-over ratio value corresponds to a concentration of the one or more other materials that is equal to a concentration of the target material output from the vessel at a moment in time; and
  a first extraction cycle ends after the control unit determines that a concentration of the target material in the fluid peaks and then reduces below a threshold level; and
  a second extraction cycle begins when the control unit controls a second flow of the brine to the vessel after the concentration of the target material reduces below the threshold level during the first extraction cycle.

* * * * *